United States Patent [19]

Yokoyama et al.

[11] Patent Number: 5,706,101
[45] Date of Patent: Jan. 6, 1998

[54] FACSIMILE APPARATUS WITH FUNCTIONAL EXPANSION UNIT

[75] Inventors: Minoru Yokoyama; Toshio Kenmochi; Yosuke Ezumi, all of Yokohama; Masakatsu Yamada, Kawasaki; Hisashi Toyoda, Yokohama; Hideyuki Terashima, Sagamihara, all of Japan

[73] Assignee: Canon Kabushiki Kaisha, Tokyo, Japan

[21] Appl. No.: 2,983

[22] Filed: Jan. 11, 1993

[30] Foreign Application Priority Data

Jan. 14, 1992 [JP] Japan .................. 4-004574

[51] Int. Cl.$^6$ .................................................. H04N 1/00
[52] U.S. Cl. .................................. 358/400; 358/468
[58] Field of Search .......................... 358/400, 401, 358/468, 473, 513, 514, 296, 302, 304; 346/107 R, 160

[56] References Cited

U.S. PATENT DOCUMENTS

| | | | |
|---|---|---|---|
| 4,318,608 | 3/1982 | Payne | 355/220 |
| 4,833,547 | 5/1989 | Mase | 358/400 |
| 4,930,017 | 5/1990 | Izawa | 358/468 |
| 4,962,430 | 10/1990 | Hiroki et al. | 358/401 |
| 5,074,449 | 12/1991 | Slonneger | 358/304 |
| 5,097,350 | 3/1992 | Baran | 358/401 |

FOREIGN PATENT DOCUMENTS

| | | |
|---|---|---|
| 0288241 | 10/1988 | European Pat. Off. . |
| 0297566 | 1/1989 | European Pat. Off. . |
| 0361459 | 4/1990 | European Pat. Off. . |
| 58-129874 | 8/1983 | Japan . |
| 60-106272 | 6/1985 | Japan . |

OTHER PUBLICATIONS

Patent Abstracts of Japan, vol. 7, No. 239 (E–206) (1384), Oct. 25, 1983.

*Primary Examiner*—Thomas D. Lee
*Attorney, Agent, or Firm*—Fitzpatrick, Cella, Harper & Scinto

[57] ABSTRACT

A compact facsimile apparatus has at least a minimum function required for a facsimile apparatus. The apparatus is used in either a connected state or a non-connected state with respect to a functional expansion unit including a functional expansion section for expanding the function or adding another function, a power supply section for supplying power to the compact facsimile apparatus, and a set portion serving as a mounting base for the compact facsimile apparatus. The used state of the facsimile apparatus can be properly set to be used either as a small, lightweight, compact facsimile apparatus or as a stationary type compact facsimile apparatus. In addition, a functional expansion unit comprises a roll-like sheet holder for continuously supplying a roll-like recording sheet to a recording section of a compact facsimile apparatus, a power supply section for supplying power to the compact facsimile apparatus, a set portion serving as a mounting base on which the compact facsimile apparatus is mounted, and a connector portion for connecting the compact facsimile apparatus to the unit. If the compact facsimile apparatus is connected to the unit, the resulting structure can be used as a stationary type facsimile apparatus.

12 Claims, 16 Drawing Sheets

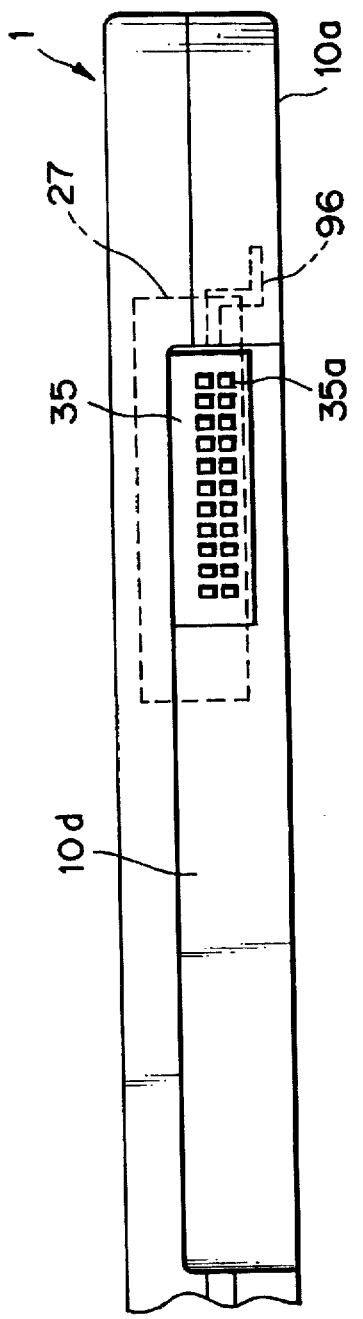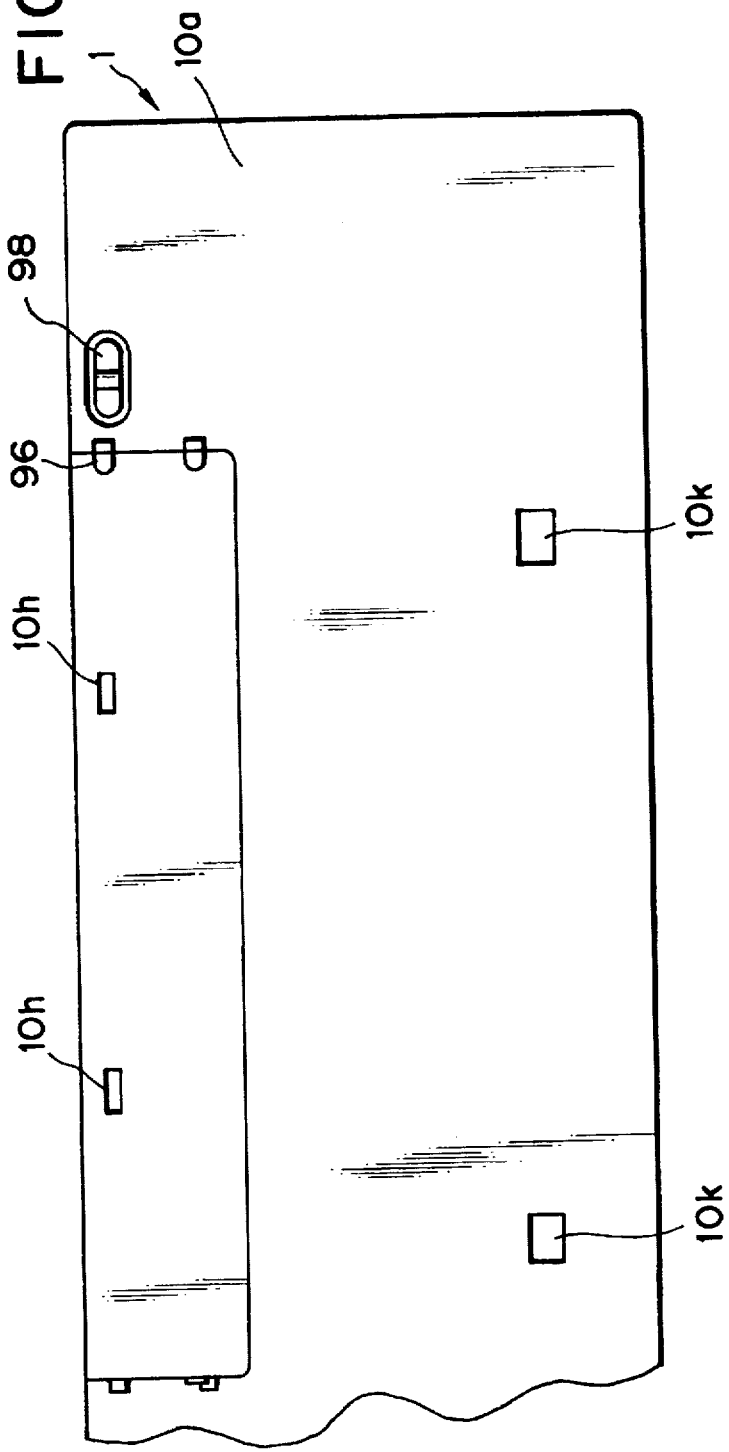

FACSIMILE APPARATUS WITH FUNCTIONAL EXPANSION UNIT

BACKGROUND OF THE INVENTION

The present invention relates to a compact facsimile apparatus and its functional expansion unit and, more particularly, to a flat, compact facsimile apparatus and a functional expansion unit connected to the compact facsimile apparatus.

A compact facsimile apparatus has been conventionally proposed. The arrangement of the recording and original reading sections of such a facsimile apparatus will be briefly described below with reference to FIG. 16.

FIG. 16 is a cross-sectional view of the conventional facsimile apparatus, which is considered to have the most compact, flattest structure at present. Referring to FIG. 16, a first opening portion 203 is formed in the upper surface of a housing cover 200, which also serves as a housing, at a position near an edge portion thereof. A second opening portion 204 is formed in the upper surface of the housing cover 200 at a backward position (on the rear surface side) with respect to the first opening portion 203. In addition, a discharge port 205 is formed in the front surface of the housing cover 200.

In the above arrangement, an original G is inserted, with its image surface facing down, through the first opening portion 203. The inserted original G is clamped between a contact line image sensor 12 and a first biasing roller 13 which is pivoted in a biased state with respect to the contact line image sensor 12. The original G is then conveyed and discharged from the discharge port 205.

On the inner surface of the upper wall of the housing cover 200, as shown in FIG. 11, a roll-like recording paper KR, which is a roll of thermal recording paper, is held to be movable in a direction of an arrow and replaceable. The color development surface of roll paper K2 is set to oppose the recording portion of a line thermal head 14 constituting the recording section. At the same time, the roll paper K2 is clamped between the line thermal head 14 and a second biasing roller 15 which is pivoted in a biased state with respect to the line thermal head 14, and is discharged outside through the second opening portion 204 after a recording operation.

With the above-described arrangement, the reading portion and the recording portion are prevented from overlapping each other in the direction of height, thereby reducing the height of the housing cover 200.

In the above-described facsimile apparatus, however, in order to reduce the height of the housing, roll-like recording paper (KR) is disposed between the reading and recording sections. As a result, the housing requires at least a space, as an extra depth, for storing the roll-like recording paper (KR). Therefore, a further reduction in the depth of the housing cannot be achieved. In addition, since all the functions required for a facsimile apparatus are integrally incorporated, the size of the apparatus is inevitably increased, thus posing a serious problem when it comes to storing the apparatus in, e.g., a business bag to carry.

In addition, since the above facsimile apparatus is designed to use only roll-like recording paper (KR), a so-called cut sheet consisting of thermal recording paper, e.g., an A4 size sheet, cannot be set in the recording section. More specifically, in order to set such a cut sheet in the recording section, a cumbersome operation is required. For example, a cut sheet may be set after roll-like recording paper is removed. Therefore, it is practically impossible to set a cut sheet in the recording section. If an opening portion specially designed for the insertion of a cut sheet is to be formed, for example, near the above-mentioned first opening portion, the strength of a bar-like partition portion formed between the first opening portion and the opening portion having a longitudinal size larger than at least the width of an A4 size sheet cannot be guaranteed. In practice, therefore, setting of a cut sheet cannot be performed.

SUMMARY OF THE INVENTION

The present invention, therefore, has been made in consideration of the above situation, and has as its principal object to provide a compact facsimile apparatus which has at least a minimum function required for a facsimile apparatus and can be reduced in size to be carried, and allow the facsimile apparatus to be connected/combined with a functional expansion section so as to expand the function, thereby realizing expansion of the function of the facsimile apparatus.

It is another object of the present invention to allow the facsimile apparatus to use a commercial power supply so as to realize the use of the apparatus as a stationary type facsimile apparatus.

It is still another object of the present invention to allow continuous supply of a roll-like recording sheet to the recording section of the facsimile apparatus connected/combined with the functional expansion unit.

It is still another object of the present invention to continuously and stably supply recording sheets having different sizes to the recording section of the facsimile apparatus.

In order to solve the above problems and achieve the above objects, according to the present invention, there is provided a compact facsimile apparatus having at least a minimum function required for a facsimile apparatus, wherein the apparatus is used in either a connected state or a non-connected state with respect to a functional expansion unit including a functional expansion section for the facsimile apparatus, and a power supply section, and also serving as a mounting base.

Preferably, the facsimile apparatus comprises an original reading section in which an original to be read is inserted through a first opening portion formed in an upper surface of a housing of the compact facsimile apparatus and is discharged from a discharge port formed in a front surface of the housing, a recording section in which a recording sheet is inserted through a second opening portion formed in the upper surface of the housing at a position closer to a rear side than the first opening portion and is discharged from the first opening portion, a control section arranged on a rear side of the recording section, a battery storage portion for a battery detachably set through a side surface on the rear side of the housing, a lock portion which is formed on the housing and is locked into a lock member of the functional expansion unit, and connector means which is connected to the functional expansion section and the power supply section in the battery storage portion, wherein after the battery is removed, the locked state with respect to the functional expansion unit is set, and the connected state therewith is set, thereby allowing a reduction in size and height of the housing.

In addition, the roll-like sheet holder section preferably comprises a storage portion for continuously supplying the roll-like recording sheet to the recording section through the second opening portion, and supporting the recording sheet to be rotatable with a recording surface thereof facing outside and allow the continuous supply of the recording sheet, a cover member having one end supported on the storage portion such that the cover member can be freely opened/closed, and the other end covering the second opening portion in a separated state therefrom, and a slanting movement preventing member, arranged near a downstream portion of the storage portion, for preventing meandering/ slanting movement of the recording sheet, and guiding the recording sheet between the second opening portion and itself with the recording sheet being kept separated from an upper surface of the compact facsimile apparatus. With this arrangement, a recording sheet can be continuously supplied to the recording section of the facsimile apparatus.

Further objects, features and advantages of the present invention will become apparent from the following detailed description of embodiments of the present invention with reference to the accompanying drawings.

BRIEF DESCRIPTION OF THE DRAWINGS

FIG. 12A is a rear view of the compact facsimile apparatus 1;

FIG. 12B is a bottom view of the compact facsimile apparatus 1;

DETAILED DESCRIPTION OF THE PREFERRED EMBODIMENTS

Figure 1A:
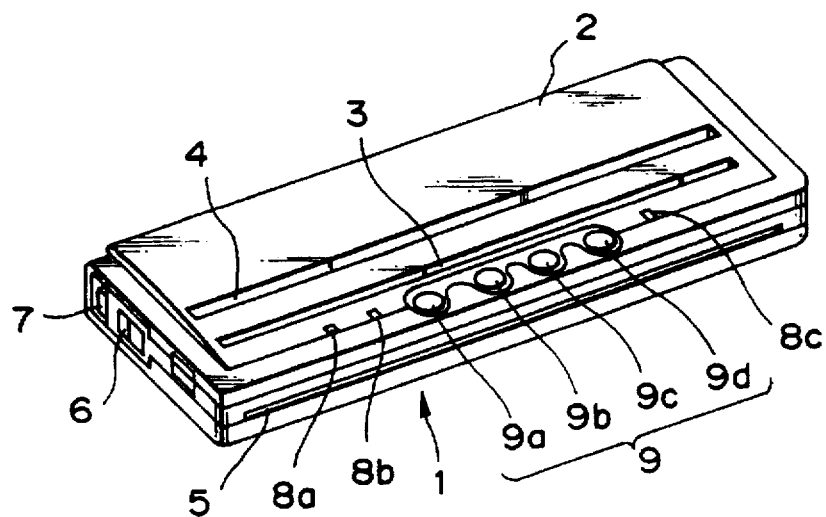
FIG. 1A is a perspective view showing the outer appearance of a compact facsimile apparatus according to the first embodiment of the present invention.
Figure 1B:
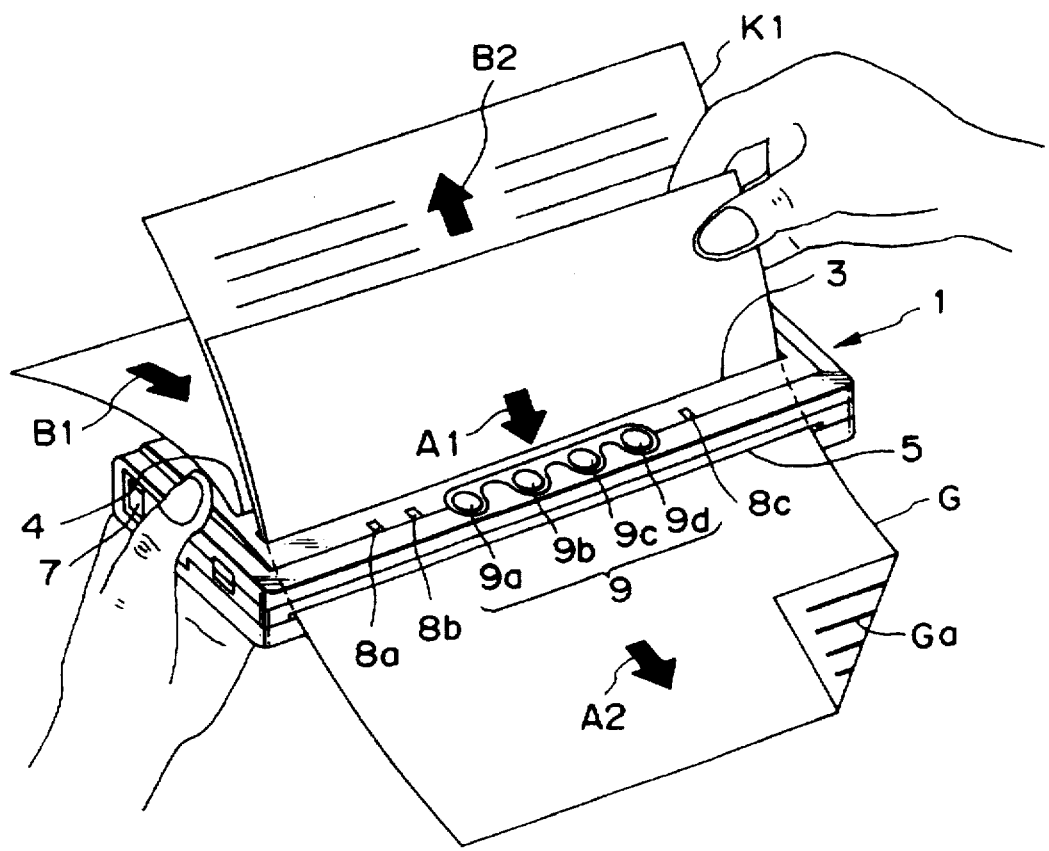
FIG. 1B is a perspective view showing the outer appearance of the compact facsimile apparatus according to the first embodiment in a used state.

Embodiments of the present invention will be described in detail below with reference to the accompanying drawings. FIG. 1A is a perspective view showing the outer appearance of a compact facsimile apparatus 1 according to the first embodiment of the present invention, which apparatus is in a state wherein neither an original nor a recording sheet are set. FIG. 1B is a perspective view showing the outer appearance of the compact facsimile apparatus 1 in a state wherein an original G and a recording sheet K1 are set and are conveyed in directions of arrows, respectively.

Referring to FIG. 1A, a housing cover 2 is a resin cover member which is formed by resin injection molding such that the cover can be separated into upper and lower parts. As indicated by the dimensions in FIG. 1A, since the housing cover 2 has small outer dimensions, i.e., a width of 300 mm, a depth of 110 mm, and a height of 32 mm the apparatus can be easily stored in an ordinary business bag. In addition, the apparatus incorporates a battery power supply and a facsimile function (both will be described later). Therefore, if only this portable facsimile apparatus is connected to a predetermined telephone line, the apparatus can be used in any place, e.g., outdoors and in an automobile. That is, the apparatus can be used as a so-called portable facsimile apparatus. Furthermore, the apparatus can satisfy demand for a reduction in the size of a facsimile apparatus.

As shown in FIG. 1A, first and second opening portions 3 and 4 are formed in the upper surface of the housing cover 2 of the compact facsimile apparatus 1 having the above-mentioned outer dimensions. The first opening portion 3 has a longitudinal size allowing an original having a width equal to that of a B4 size sheet to be inserted therein. The second opening portion 4 similarly has a longitudinal size allowing a recording sheet having a width equal to that of a B4 size sheet to be inserted therein. In addition, a discharge port 5 is formed in the front surface of the housing cover 2 so as to allow a B4 size original to be discharged therefrom.

An operation switch section 9 is arranged near an edge portion on the upper surface of the housing cover 2. The operation switch section 9 includes a fine/normal mode setting switch 9a, a copy/field mode setting switch 9b, a stop switch 9c, and a start switch 9d for starting a transmission mode in the presence of a sheet, and a reception mode in the absence of a sheet. An LED 8c for displaying a power ON state is arranged on the right side of the operation switch section 9, while an LED 8a for displaying an operation error and an LED 8b for displaying a fine mode set state are arranged on the left side of the operation switch section 9. These LEDs are arranged almost in a line. A power switch 7 and an external connector 6 for connection with a telephone are arranged on the left side surface of the compact facsimile apparatus 1.

In the compact facsimile apparatus 1 having the above-described arrangement, as shown in FIG. 1B, an original G is inserted, with an image surface Ga facing down, through the first opening portion 3 in the direction indicated by an arrow A1, and is discharged outside through the discharge port 5.

On the other hand, a cut sheet K1 consisting of thermal recording paper is inserted through the second opening portion 4 in the direction indicated by an arrow B1, and is discharged from the first opening portion 3 in the direction indicated by an arrow B2 (upward). In this manner, an original reading operation and a recording operation in the facsimile apparatus can be performed in units of cut sheets.

With the above-described arrangement, the flat, compact facsimile apparatus 1 described above is held in one hand of a user, and originals are inserted one by one with the other hand. In the reception mode, reception can be performed by setting only a thermal recording cut sheet K1 through the second opening portion 4. In the copy mode, by simultaneously setting the original G and the cut sheet K1, copies can be made one by one without making line connection.

Figure 2:
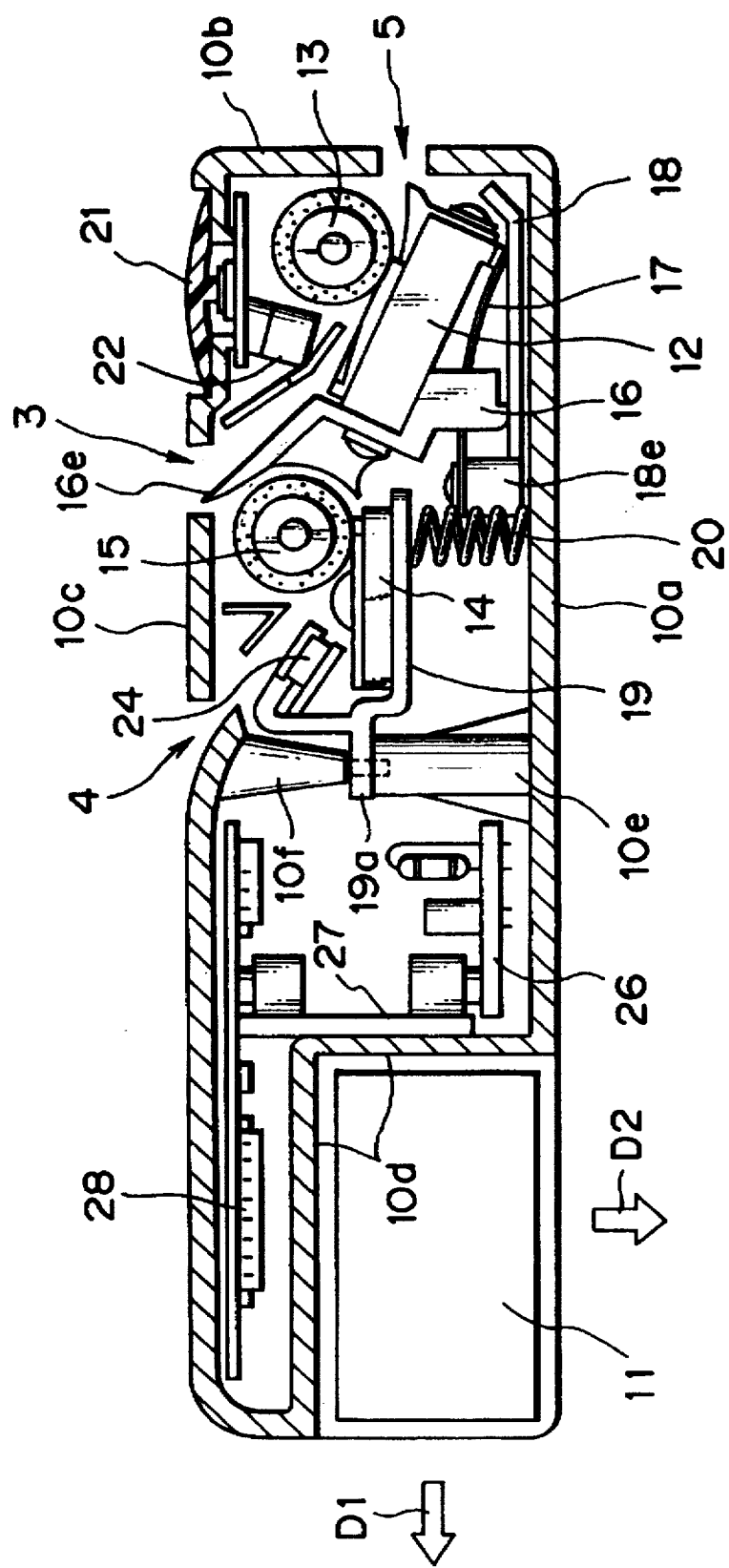
FIG. 2 is a cross-sectional view of the apparatus in FIGS. 1A and 1B.

The internal arrangement of the apparatus will be described next with reference to FIG. 2. FIG. 2 is a cross-sectional view taken along a plane crossing one of the switches constituting the operation switch section 9 of the compact facsimile apparatus 1 shown in FIGS. 1A and 1B, illustrating the arrangement of the main part inside the apparatus. Referring to FIG. 2, the above-described housing cover 2 is constituted by a cover bottom plate 10a, a cover upper plate 10c, a cover front plate 10b, a battery storage portion 10d, and the like in the form of a box, in which the respective components can be incorporated. The first and second opening portions 3 and 4 are formed in the cover upper plate 10c, as shown in FIG. 2, while the discharge port 5 is formed almost at the center of the cover front plate 10b. In addition, a switch cover 21 also having a display function covers the operation switch section 9.

The arrangement of the original reading section will be described below. A CS roller 13 as a first biasing roller serves to bring the original G into tight contact with the original reading portion of a contact sensor 12 to obtain a frictional force, thus conveying the original G. The CS roller 13 is pivotally supported on both sides of a sheet metal base 18 which is bent upward.

In the arrangement in which the outer surface of the CS roller 13 is always set in a biased state with respect to the reading portion of the contact sensor 12, the contact sensor 12 is fixed to a sensor base plate 16 swingably supported on the sheet metal base 18. The integral structure constituted by the sensor base plate 16 and the contact sensor 12 is always biased against the CS roller 13 by a spring 17 having one end fixed to a stud 18e integrally formed on the sheet metal base 18. The sensor base plate 16 has a cross-sectional shape shown in FIG. 2. More specifically, the sensor base plate 16 guides the original G, and has a sharp distal end portion 16e and also has a portion extending along the outer surface of a TPH roller 15 of the recording section (to be described above). With this structure, a cut sheet is guided to the first opening portion 3, and paper can be cut with the distal end portion 16e.

The arrangement of the recording section will be described below. The TPH roller 15 as the second biasing roller for conveying the thermal recording cut sheet K1 is pivotally supported on the sheet metal base 18. The TPH roller 15 brings the cut sheet K1 into tight contact with the recording portion of a line thermal head 14 to obtain a frictional force, thus conveying the cut sheet K1. In order to set such a tight contact state, the outer surface of the TPH roller 15 is always set in a biased state with respect to the recording portion of the line thermal head 14. In order to set this state, the line thermal head 14 is fixed to a thermal head board 19, as shown in FIG. 2. More specifically, the thermal head board 19 is swingably held between studs 10f and 10e through a hole 19a formed in the board 19 so as not to be slipped off. The stud 10f extends from the inner surface of the second opening portion 4. The stud 10e extends upright from the cover bottom plate 10a. The thermal head board 19 is biased by a coil spring 20 held between the lower surface of the board 19 and the sheet metal base 18 in a compressed state, thereby always biasing the recording portion of the line thermal head 14 against the TPH roller 15. In this way, an original convey path for an original and a sheet convey path for the recording sheet are constructed.

In order to drive the CS roller 13 and the TPH roller 15 while they are kept in a biased state, the coefficient of friction of each roller with respect to the reading portion of the contact sensor 12 or the recording portion of the line thermal head 14 may be set to be smaller than that of each roller with respect to an original or a recording sheet. Therefore, a special material is used for the outer surfaces of the CS roller 13 and the TPH roller 15 instead of a rubber material.

An electronic board for executing the facsimile function is constituted by a chip board 28 and a discrete board 26 which are respectively arranged along the upper and lower inner surfaces of the housing cover 2, as shown in FIG. 2. The chip board 28 has LSI chips, IC chips, chip parts, and the like mounted on its surface. On the discrete board 26, resistors, capacitors, diodes, and the like are mounted through a reflow solder bath. Connection of this electronic board is made through a connector board 27. With this arrangement, the manufacturing process of each board can be simplified, and the storage space for the electronic board can be efficiently ensured in accordance with a reduction in the size of the apparatus.

A rechargeable battery 11 is stored in the above-mentioned battery storage portion 10d to be detachable in the directions indicated by arrows D1 and D2 in FIG. 2. As this rechargeable battery 11, for example, a nickel-cadmium battery capable of generating high power can be used.

In the above-described arrangement, as shown in FIG. 1B, when the original G is inserted, with the image surface Ga facing down, through the first opening portion 3 in the direction indicated by the arrow A1, a predetermined reading operation is performed at the reading section. Thereafter, the original G is discharged outside (in the direction indicated by the arrow A2) through the discharge port 5. On the other hand, when the thermal recording cut sheet K1 is inserted through the second opening portion 4 in the direction indicated by the arrow B1, a predetermined recording operation is performed at the recording section. Thereafter, the cut sheet K1 is discharged from the first opening portion 3 in the direction indicated by the arrow B2 (upward). In this manner, an original reading operation and a recording operation in the facsimile apparatus can be performed in units of cut sheets.

Figure 3:
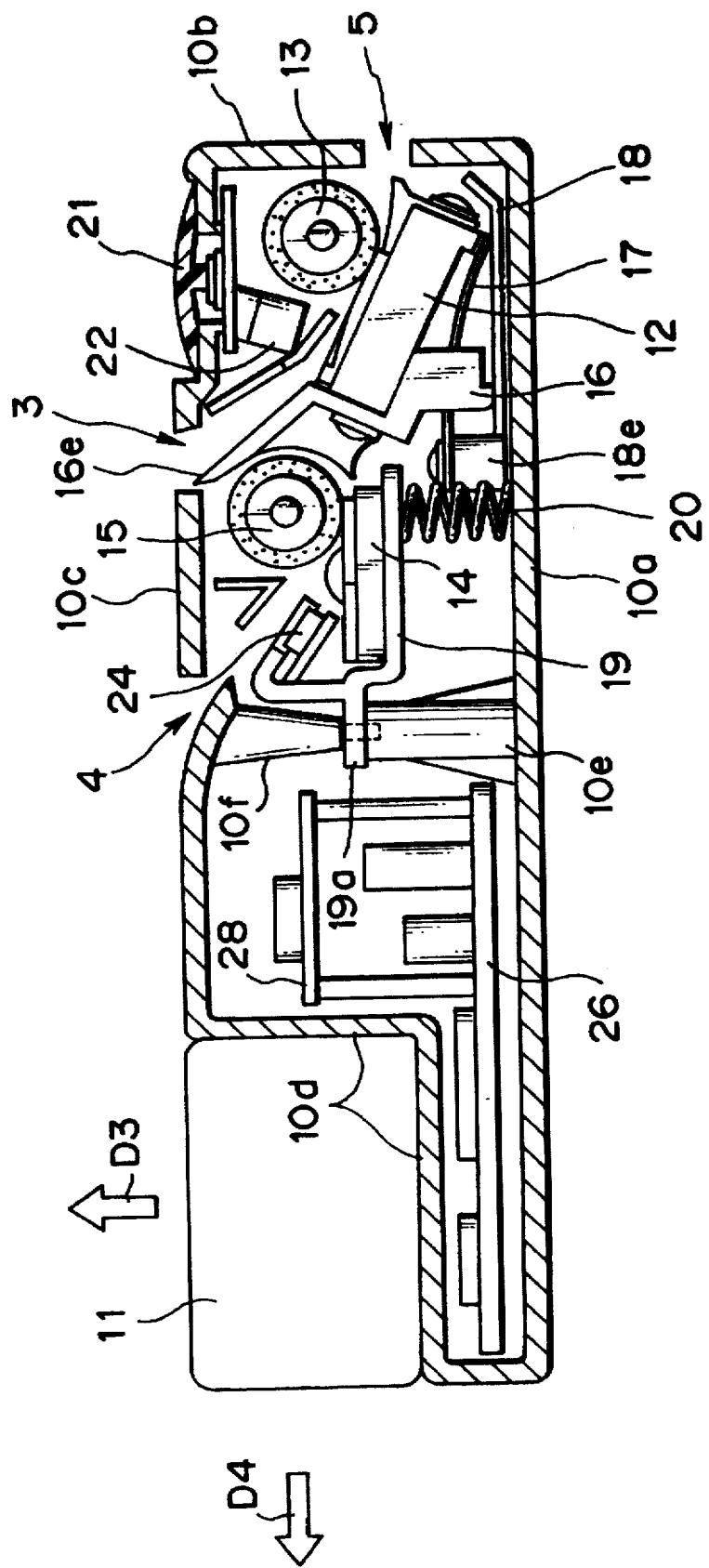
FIG. 3 is a cross-sectional view of a compact facsimile apparatus according to the second embodiment of the present invention.

FIG. 3 is a cross-sectional view showing a compact facsimile apparatus according to the second embodiment of the present invention. Since the arrangements of the reading and recording sections of the second embodiment are almost the same as those of the first embodiment described above, only different portions will be described below. Referring to FIG. 3, a cover battery storage portion 10d is formed to be continuous with the upper and lower surfaces of the housing so as to allow a rechargeable battery 11 to be detachable in the directions indicated by arrows D3 and D4. In addition, a chip board 28 and a chip board 28 are disposed through a spacer to form a two-story structure, as shown in FIG. 3.

In the above arrangement, similar to the first embodiment, as shown in FIG. 1B, when an original G is inserted, with an image surface Ga facing down, through a first opening portion 3 in the direction indicated by the arrow A1, a predetermined reading operation is performed at the reading section. Thereafter, the original G is discharged outside (in the direction indicated by the arrow A2) through a discharge port 5. On the other hand, when a thermal recording cut sheet K1 is inserted through a second opening portion 4 in the direction indicated by the arrow B1, a predetermined recording operation is performed at the recording section. Thereafter, the cut sheet K1 is discharged from the first opening portion 3 in the direction indicated by the arrow B2 (upward). In this manner, an original reading operation and a recording operation in the facsimile apparatus can be performed in units of cut sheets.

Figure 4:
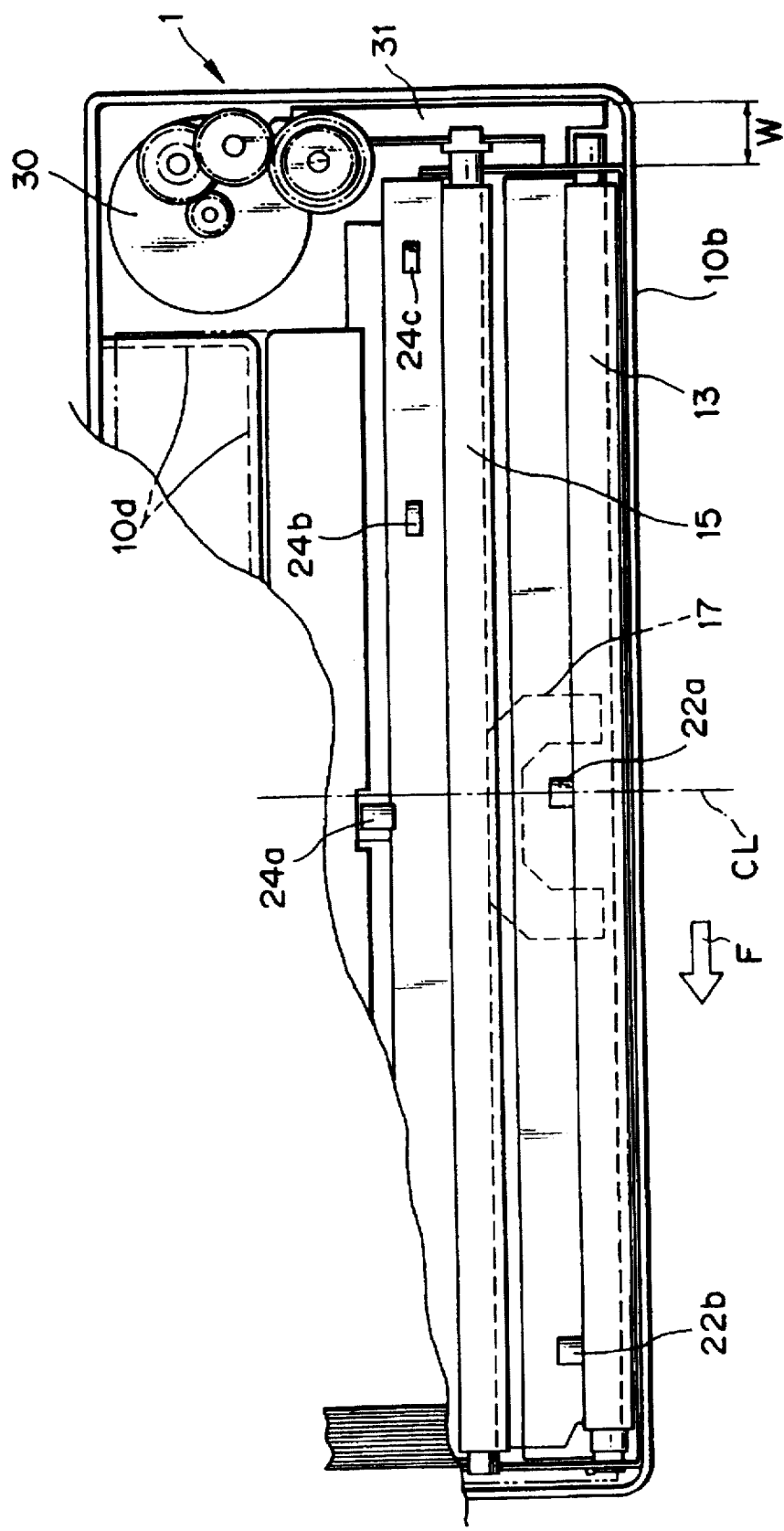
FIG. 4 is a plan view of a compact facsimile apparatus common to the first and second embodiments.

FIG. 4 is a plan view of a compact facsimile apparatus 1 in a state wherein the reading section and the recording section are offset to the left (in the direction indicated by an arrow F) with respect to a central line CL of the apparatus. The reading and recording sections will be described below with reference to the locations of a CS roller 13 and a TPH roller 15 in FIG. 4. The central positions of the rollers 13 and 15 in their longitudinal direction are offset to the left (the direction indicated by the arrow F in FIG. 4) with respect to the central line CL so as to ensure a space having a width W in the housing of the apparatus. A gear train 31 is disposed in this space to allow transmission of the driving force of a pulse motor 30 as a driving source for each roller.

Figure 5:
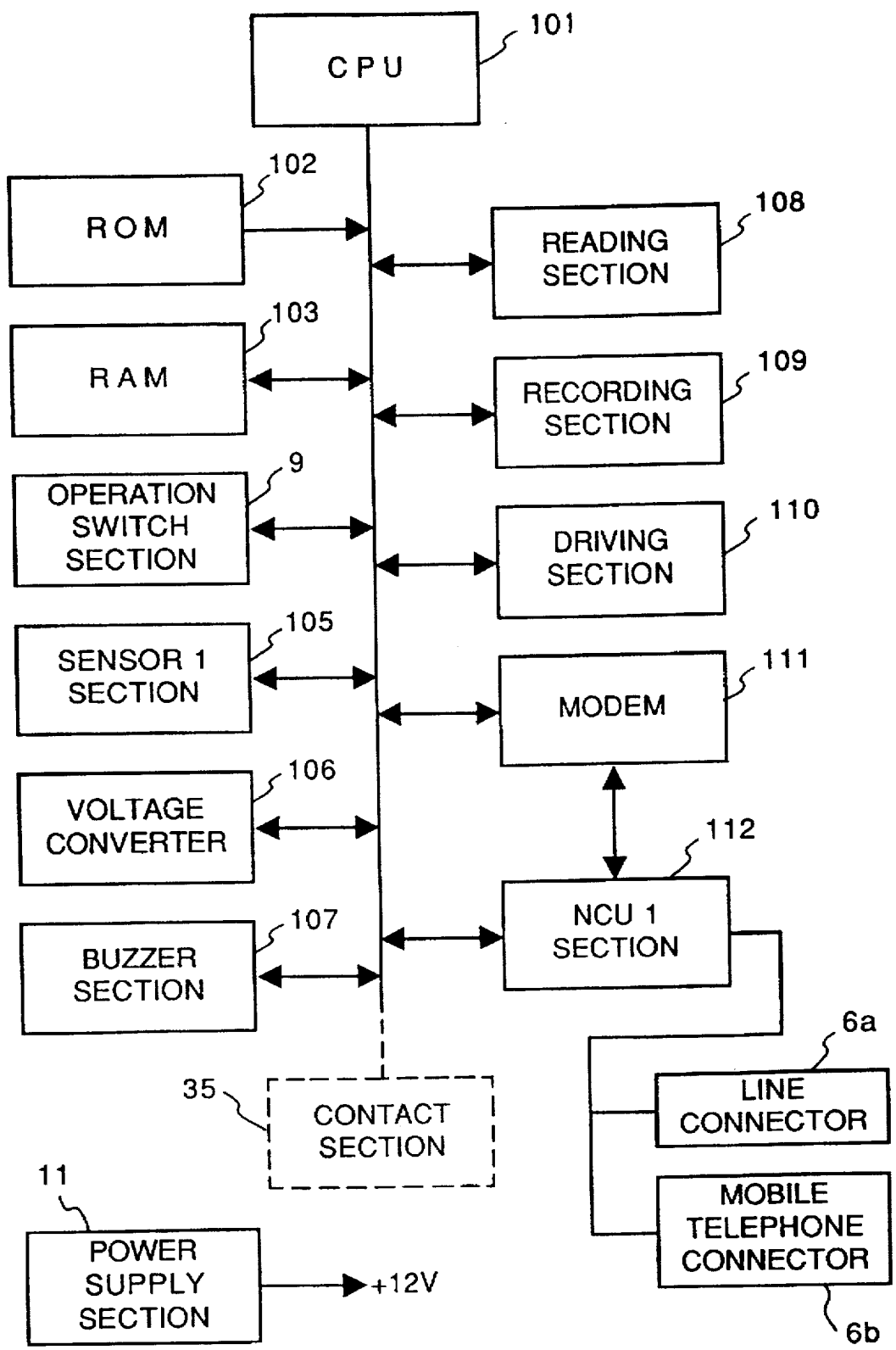
FIG. 5 is a block diagram of the compact facsimile apparatus according to the first and second embodiment.

DES sensors 22a and 22b for respectively detecting the presence/absence of originals having difference sizes, and RPS sensors 24a, 24b, and 24c for respectively detecting the presence/absence of recording sheets having difference sizes are respectively arranged in the reading and recording sections at the respective positions shown in FIG. 4. FIG. 5 is a block diagram of the compact facsimile apparatus 1. Referring to FIG. 5, the following components are connected to a CPU 101: a ROM 102, a RAM 103, an operation switch section 9, a sensor 1 section 105 constituted by the above-mentioned DES sensors 22 and the RPS sensors 24, a voltage converter 106 for obtaining a voltage of 5 V from a single power supply voltage (12 V) applied from the rechargeable battery 11, a buzzer section 107 for informing an operation/action state, a reading section 108 for processing a read signal from a contact sensor 12, a recording section 109 for outputting a recording signal by using a line thermal head 14, a driving section 110 for driving the pulse motor 30 in a predetermined manner, a MODEM 111 for converting a line signal, and an NCU 1 section 112 connected to a line connector 6a or a mobile telephone connector 6b.

A contact section 35 indicated by the broken line in FIG. 5 is a connection for external connection, which is used to add a function to the compact facsimile apparatus 1 described above. The contact section 35 is arranged on the connector board 27.

Figure 6:
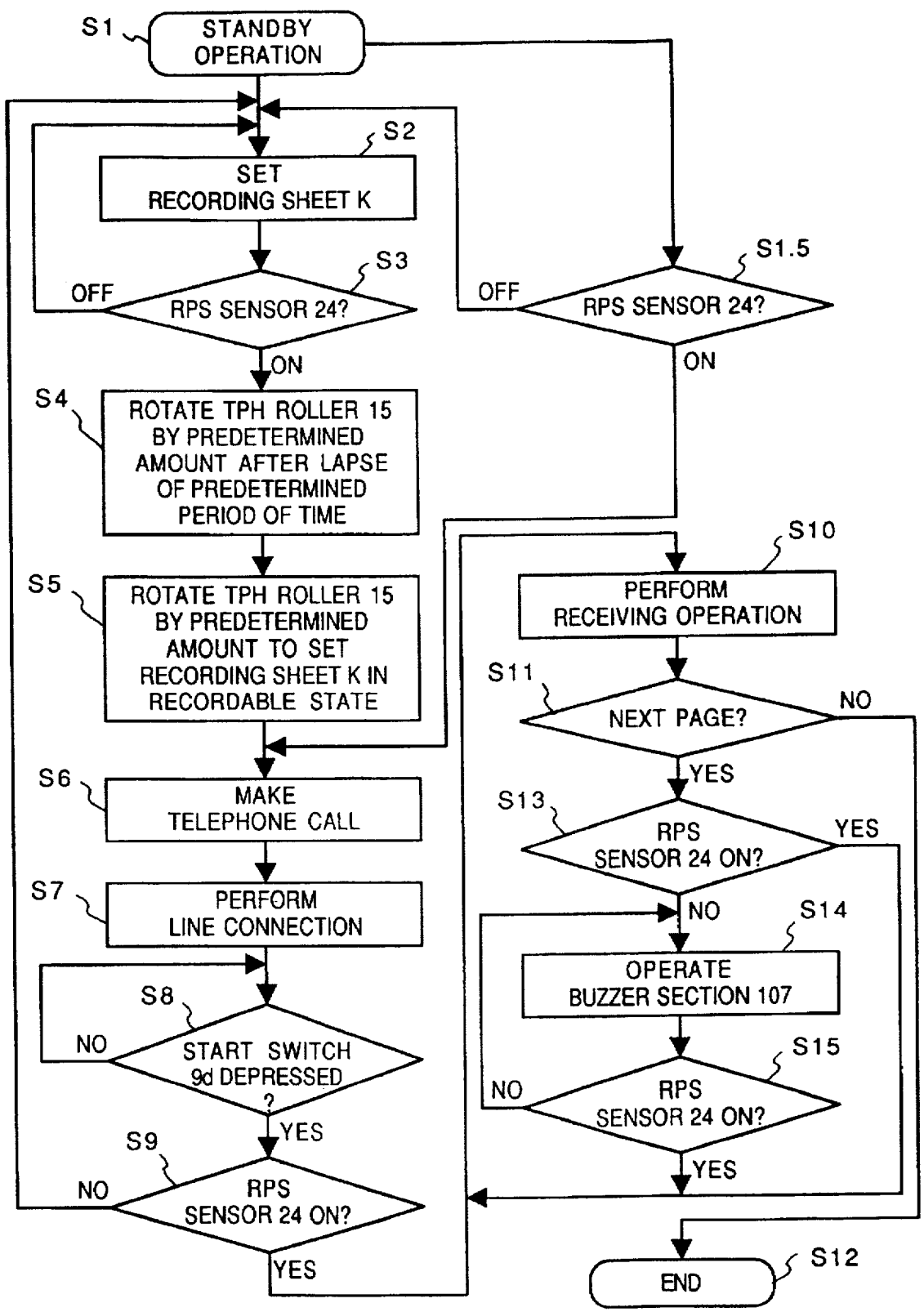
FIG. 6 is a flow chart showing a reception mode.
Figure 7:
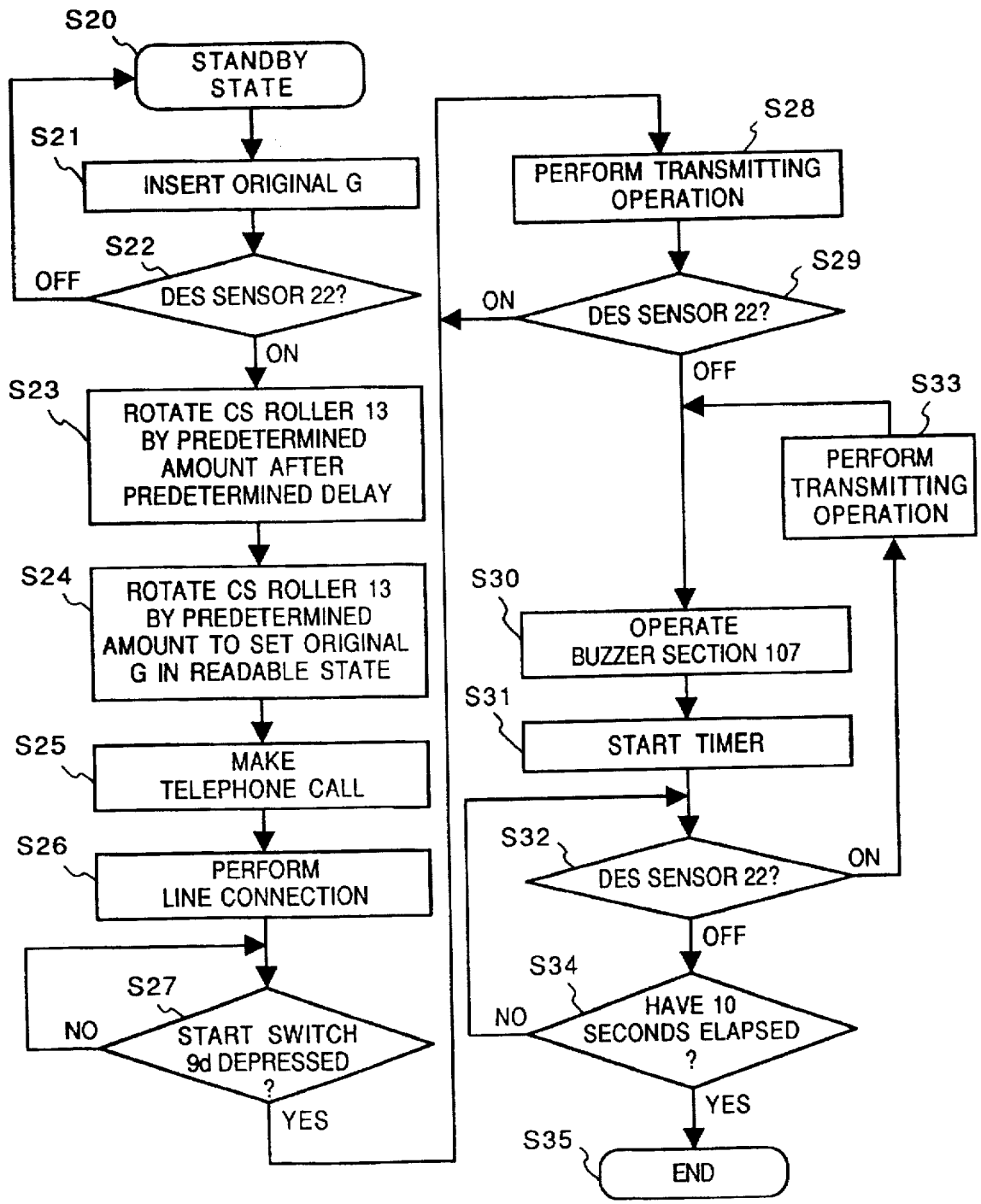
FIG. 7 is a flow chart showing a transmission mode.

Operations of the apparatus having the above arrangement in the reception and transmission modes will be described below with reference to the flow charts shown in FIGS. 6 and 7. Referring to FIG. 6, when the start switch 9d is depressed, a standby state is set in step S1 to wait for a receiving operation. Following the step S1, in order to examine if the recording sheet K is already inserted or not the flow advances to step S1.5. In step S1.5, if RPS sensors 24 is off state because the recording sheet K is not inserted, then the flow advances to step S2, and if RPS sensors 24 is on state because the recording sheet K is already inserted then the folw advances to step S6. The flow then advances to step S2 to set a recording sheet K (the cut sheet K1 or the roll paper K2). If it is determined in step S3 that the RPS sensor 24 is turned on upon detection of the presence of the recording sheet K, the flow advances to step S4 to pivot the TPH roller 15 by a predetermined amount after a lapse of a predetermined period of time so as to bring the leading end portion of the recording sheet K into the gap between the TPH roller 15 and the line thermal head 14, thereby eliminating any skew of the recording sheet K.

In step S5, the TPH roller 15 is pivoted by a predetermined amount to set the recording sheet K in a recordable state. In step S6, a telephone call is made with respect to the transmitting end. In step S7, line connection is performed. In step S8, the start switch 9d is depressed. Thereafter, the flow advances to step S9 to check the presence/absence of the recording sheet K again by using the RPS sensor 24. If the RPS sensor 24 is turned on, a reception operation is started in step S10, and a recording operation is completed. The flow then advances to step S11 to check the presence/absence of the next page from the transmitting end. If NO in step S11, the receiving operation is ended (step S12).

If YES in step S11, the flow advances to step S13 to wait for the second recording sheet K to be set. If the RPS sensor 24 is turned on upon detection of the presence of the recording sheet K, the flow advances to step S10 to execute a receiving operation. If it is determined in step S13 that the RPS sensor 24 is not turned on after a lapse of a predetermined period of time, the flow advances to step S14 to operate the buzzer section 107 so as to urge the user to set a recording sheet K. If the recording sheet K is set, and it is determined in step S15 that the RPS sensor 24 is turned on, the flow advances to step S10 to execute a receiving operation. Subsequently, a similar operation is repeated to perform reception of a predetermined number of pages.

An operation in the transmission mode will be described next with reference to the flow chart shown in FIG. 7. When the start switch 9d is depressed, a standby state is set in step S20 to wait for a transmitting operation. The flow then advances to step S21 to set an original G. If it is determined in step S22 that the DES sensor 22 is turned on upon detection of the presence of the original G, the flow advances to step S23 to pivot the CS roller 13 by a predetermined amount after a lapse of a predetermined period of time to bring the leading end portion of the original G into the gap between the CS roller 13 and the contact sensor 12, thereby eliminating/correcting any skew of the original G.

In step S24, the CS roller 13 is pivoted by a predetermined amount to set the original G in a readable state. In step S25, a telephone call is made with respect to the receiving end. In step S26, line connection is performed. In step S27, the start switch 9d is depressed. Thereafter, the flow advances to step S28 to start a transmitting operation. In step S29, the presence/absence of the trailing end portion of the original G is checked. If NO in step S29, the transmitting operation is ended (step S29).

After the transmitting operation, the flow advances to step S30 to operate the buzzer section 107 so as to urge the user to set the next original G. The flow then advances to step S31 to start an internal timer. If it is determined in step S32 that the DES sensor 22 is turned on, the flow advances to step S33 to execute a transmitting operation. In contrast to this, if the OFF state of the DES sensor 22 continues for 10 seconds in step S34, the absence of the next original is determined. The processing is then ended in step S35.

Figure 8A:
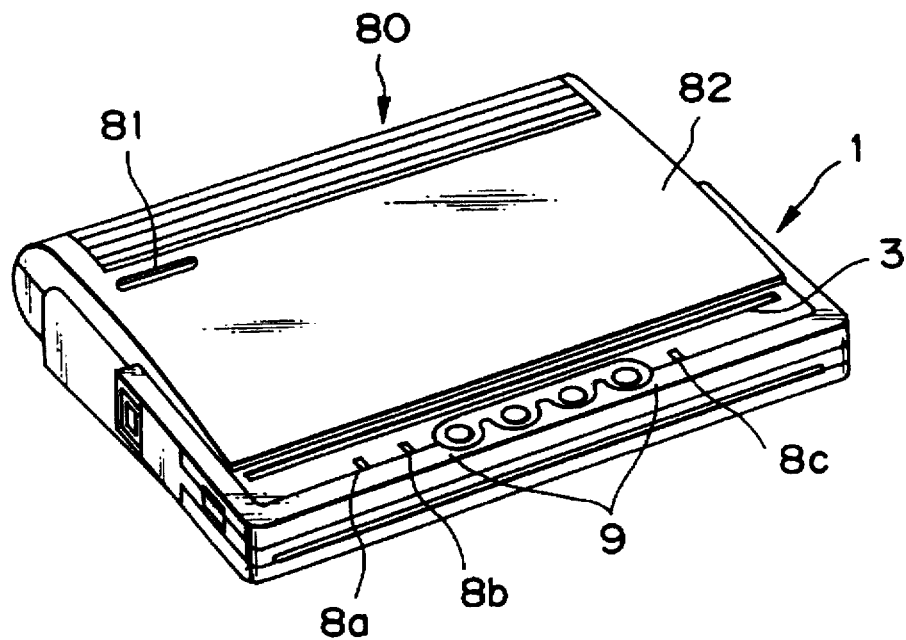
FIG. 8A is a perspective view showing the outer appearance of a structure obtained by combining a compact facsimile apparatus 1 and a mounting base 80 as a functional expansion unit.
Figure 8B:
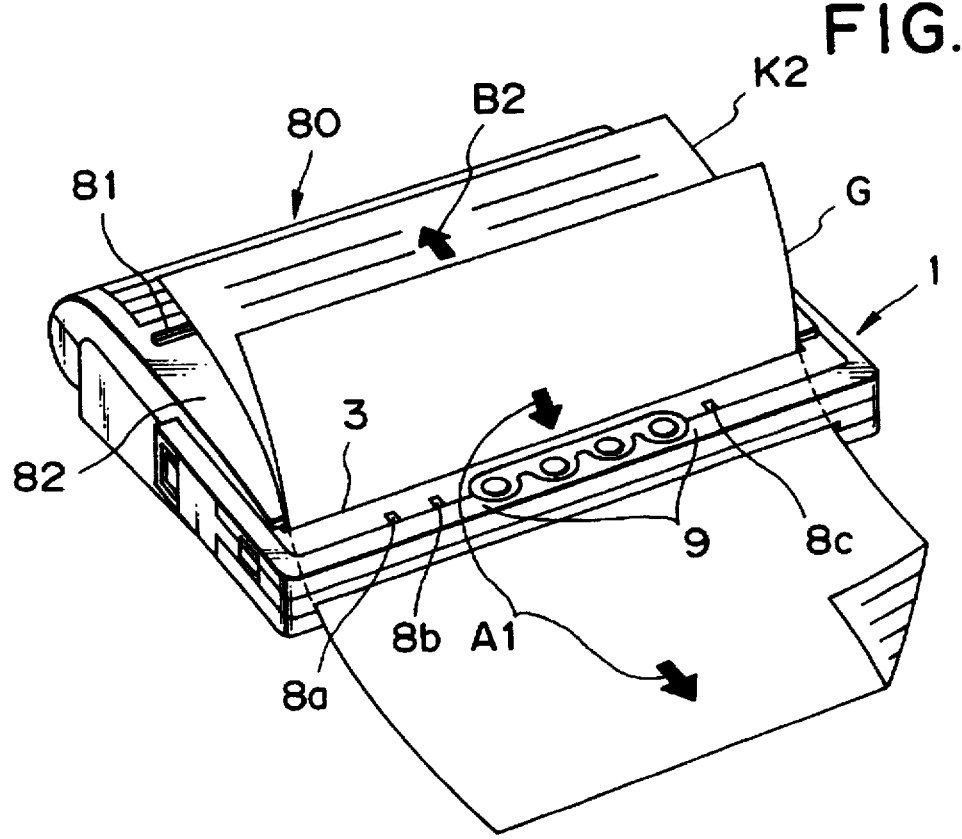
FIG. 8B is a perspective view showing the outer appearance of the structure in a used state.

FIG. 8A is a perspective view showing the outer appearance of a structure obtained by combining a compact facsimile apparatus 1 and a mounting base 80 as a functional expansion unit. FIG. 8B is a perspective view showing the outer appearance of the structure in a used state. Referring to FIG. 8A, lock portions for holding the compact facsimile apparatus 1 and the mounting base 80 in the fixed state shown in FIG. 8A are arranged therebetween. In this arrangement, the second opening portion 4 is covered with a distal end portion of a mounting base cover portion 82 of the mounting base 80, and the operation switch section 9 and the display section 8 are exposed. In the combined state shown in FIG. 8A, expanded functions of the facsimile apparatus can be operated through an operation display portion on the mounting base cover portion 82 which can be operated from above.

In the above arrangement, as shown in FIG. 8B, originals G are inserted one by one through the first opening portion 3, and each original G is conveyed from the discharge port 5 in the direction indicated by an arrow A1, while the roll paper K2 stored inside the mounting base 80 is discharged from the first opening portion 3 and is conveyed in the direction indicated by an arrow B2.

Figure 9:
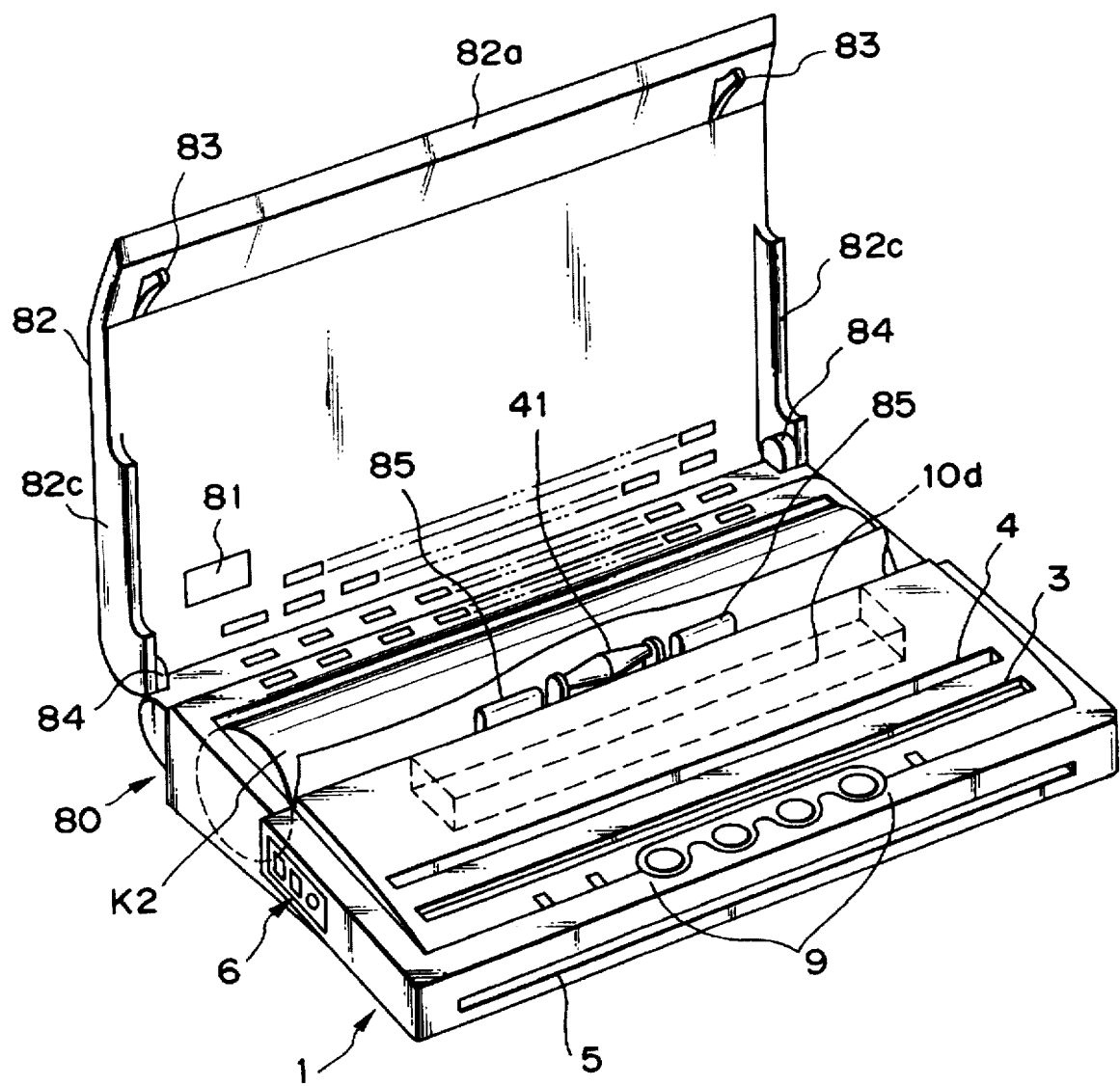
FIG. 9 is a perspective view showing the outer appearance of the structure obtained by combining the compact facsimile apparatus 1 and the mounting base 80 as the functional expansion unit in a state wherein a mounting base cover portion 82 is opened.

The internal arrangements of the facsimile apparatus 1 and the mounting base 80 which are connected/combined with each other will be described below. FIG. 9 is a perspective view of the outer appearance of the structure obtained by connecting/combining the compact facsimile apparatus 1 and the mounting base 80 as the functional expansion unit in a state wherein the mounting base cover portion 82 is opened. Referring to FIG. 9, the cover battery storage portion 10d formed in the compact facsimile apparatus 1 and indicated by the broken lines is designed to allow the rechargeable battery 11, which is the above-mentioned flat, elongated secondary battery which can be repeatedly charged, to be detachably set therein. In order to set the state shown in FIG. 9, the rechargeable battery 11 is removed. A connector portion 91 (to be described later) integrally formed on the mounting base 80 is inserted in a space formed after the rechargeable battery 11 is removed.

In order to continuously supply the roll paper K2, stored in the mounting base 80, to the recording section of the compact facsimile apparatus 1, the roll paper can be set in the mounting base 80 by dropping it therein, and the cover portion 82 can be opened to almost a vertical position, as shown in FIG. 9. For this purpose, the cover portion 82 is pivotally supported on a support portion 84 of the mounting base 80, while a pair of stoppers 83 formed on the lower surface of an edge portion 82a of the cover portion 82 are inserted/locked in the second opening portion 4 of the compact facsimile apparatus 1. In addition, side surface portions 82c are integrally formed on both side edge portions of the cover portion 82. While the cover portion 82 is closed, all the components incorporated in the apparatus are concealed. Furthermore, since the cover portion 82 is designed to cover only the second opening portion 4 as a recording paper insertion port without covering the first opening portion 3, reentrance of discharged recording paper through the first opening portion can be prevented.

To prevent slanting/meandering movement of the roller paper K2, an alignment roller 41 is formed into a barrel-like shape such that the diameter of a central portion is set to be larger than that of two side portions, as shown in FIG. 9. This roller 41 is pivotally supported on the mounting base 80. With the alignment roller 41, tension generated when the roll paper K2 is conveyed can be caused to concentrate on the center of the roll paper K2 in the direction of width thereof, thereby preventing slanting/meandering movement of the roll paper K2.

Levers 85 are arranged on both sides of the alignment roller 41. The levers 85 are operated to attach/detach the compact facsimile apparatus 1.

Figure 10:
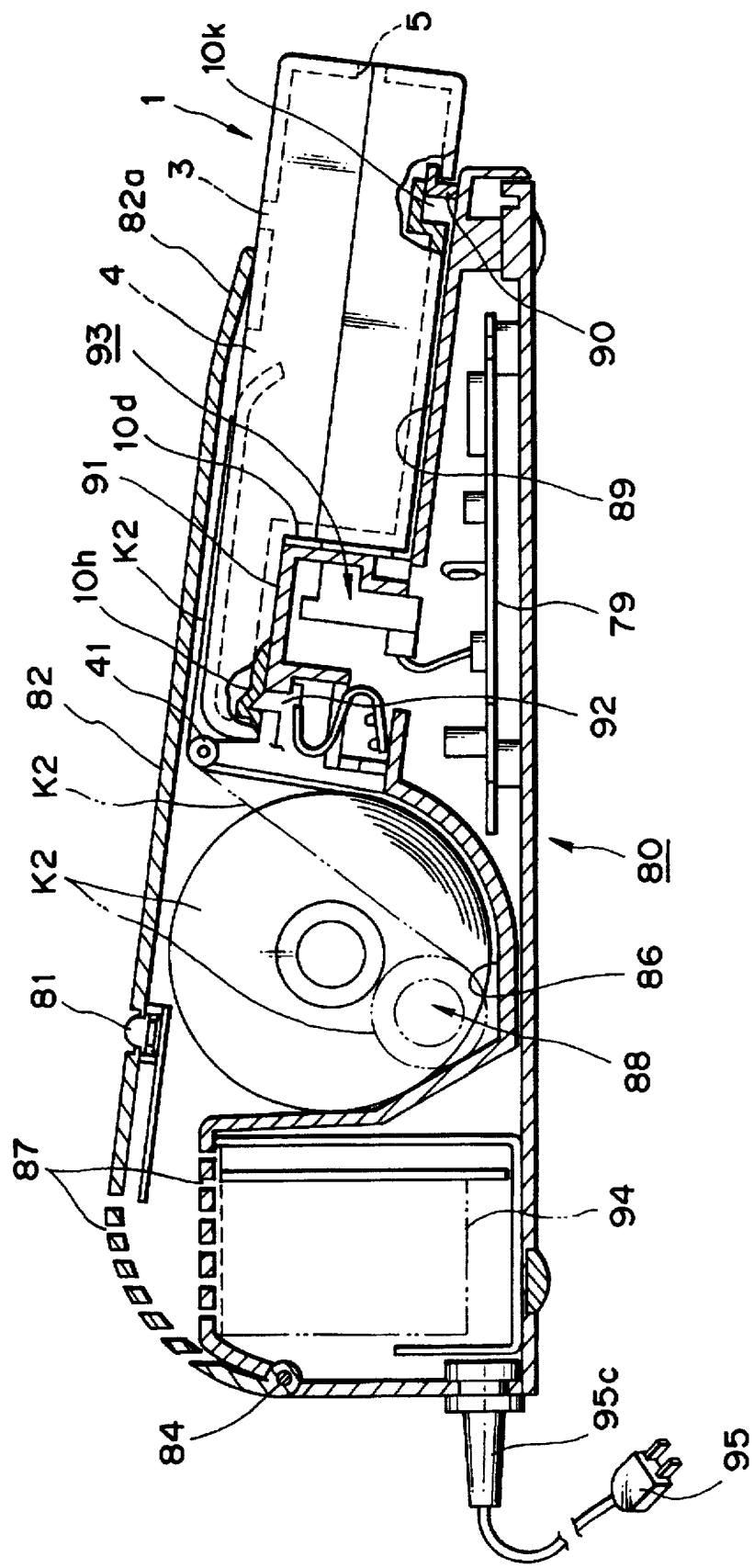
FIG. 10 is a cross-sectional view of the structure obtained by combining the compact facsimile apparatus 1 and the mounting base 80.

FIG. 10 is a cross-sectional view showing the structure obtained by connecting/combining the compact facsimile apparatus 1 and the mounting base 80. The same reference numerals in FIG. 10 denote the same parts as those described above, and a description thereof will be omitted. Only characteristic features of the structure will be described below. The mounting base 80 is placed on a desk and hence has rubber feet on its bottom surface so as not to be moved. A power cord 95 connected to a commercial power supply extends from the rear surface of the mounting base 80 through a grommet 95c so that power can be supplied to a switching power supply 94, indicated by the alternate long and two short dashed lines in FIG. 10, which is connected to the power cord 95. Since the switching power supply 94 generates heat, heat dissipation holes 87 are formed therein to let heat escape upward. Heat can be dissipated outside through heat dissipation holes 78 in the cover portion 82.

As the roll paper K2 is consumed, the state of the maximum diameter indicated by the solid line in FIG. 10 changes to the state of the minimum diameter indicated by the alternate long and two short dashed line. In order to pivotally support the roll paper K2 in either state, a slide sheet 86 is arranged on the bottom surface of a storage portion 88 of the mounting base 80. In addition, the roll paper K2 fed from the storage portion 88 to be inserted in the second opening portion 4 through the alignment roller 41 is conveyed with the recording surface of the roller paper K2 facing the upper surface of the compact facsimile apparatus 1. Therefore, as shown in FIG. 10, a gap is formed between the recording surface and the upper surface of the apparatus 1 to prevent damage to the recording surface.

Lock holes 10k and 10h are formed in the bottom of the compact facsimile apparatus 1. A pawl 90 formed on a set portion 89 of the mounting base 80 is locked in the lock hole 10k. The lock hole 10h is formed in part of the cover battery storage portion 10d. A lock member 92 formed on the mounting base 80 is locked in the lock hole 10h.

As shown in FIG. 10, an expansion board 79 having an expanded function is fixed to the inner bottom surface of the mounting base 80 and is connected to a connector 93 as another connector means for setting a connected state with respect to the compact facsimile apparatus 1.

Figure 11:
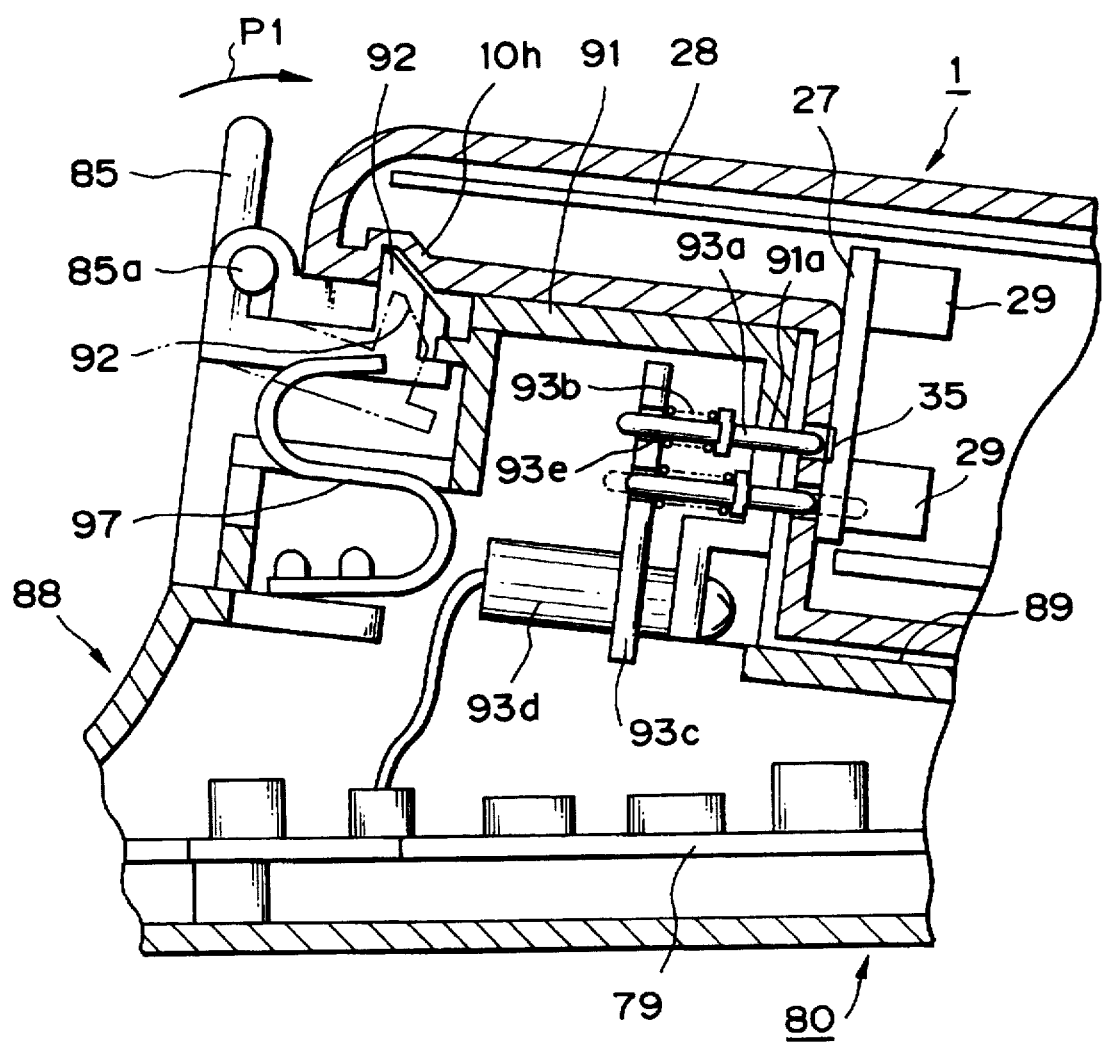
FIG. 11 is an enlarged side view showing part of a contact section (connector) in FIG. 10.

FIG. 11 is an enlarged view showing part of the structure in FIG. 10, specifically the arrangement of the connector 93 and a lock mechanism operated by the above-mentioned levers 85. Referring to FIG. 11, each lever 85 is pivotally supported on the mounting base 80. 25 When the lever 85 is operated in the direction indicated by an arrow P1, it is moved to the position indicated by the broken line to release a locked state. In addition, since the biasing force of a resin spring 97 always acts on the lever 85, the lock member 92 is always biased at the position indicated by the solid line in FIG. 11 while the lever 85 is locked, thereby holding the locked state shown in FIG. 10.

A connector pin 93a to be connected to the contact portion 35 of the connector board 27 of the compact facsimile apparatus 1 is biased by a coil spring 93b, thus allowing a connected state to be described later. In this case, an optical connector formed by coupling a light-receiving element to a light-emitting element may be used in place of such a mechanical contact.

FIG. 12A is a rear view of the compact facsimile apparatus 1. FIG. 12B is a bottom view of the apparatus. Referring to FIG. 12A, when the rechargeable battery 11 is removed, the contact section 35 can be exposed outside through a hole formed in part of the cover battery storage portion 10d. In addition, the contact connected to the rechargeable battery 11 receives power from the switching power supply 94 on the mounting base 80.

Referring to FIG. 12B, two pairs of lock holes 10h and 10k, each described above, are formed.

Figure 13:
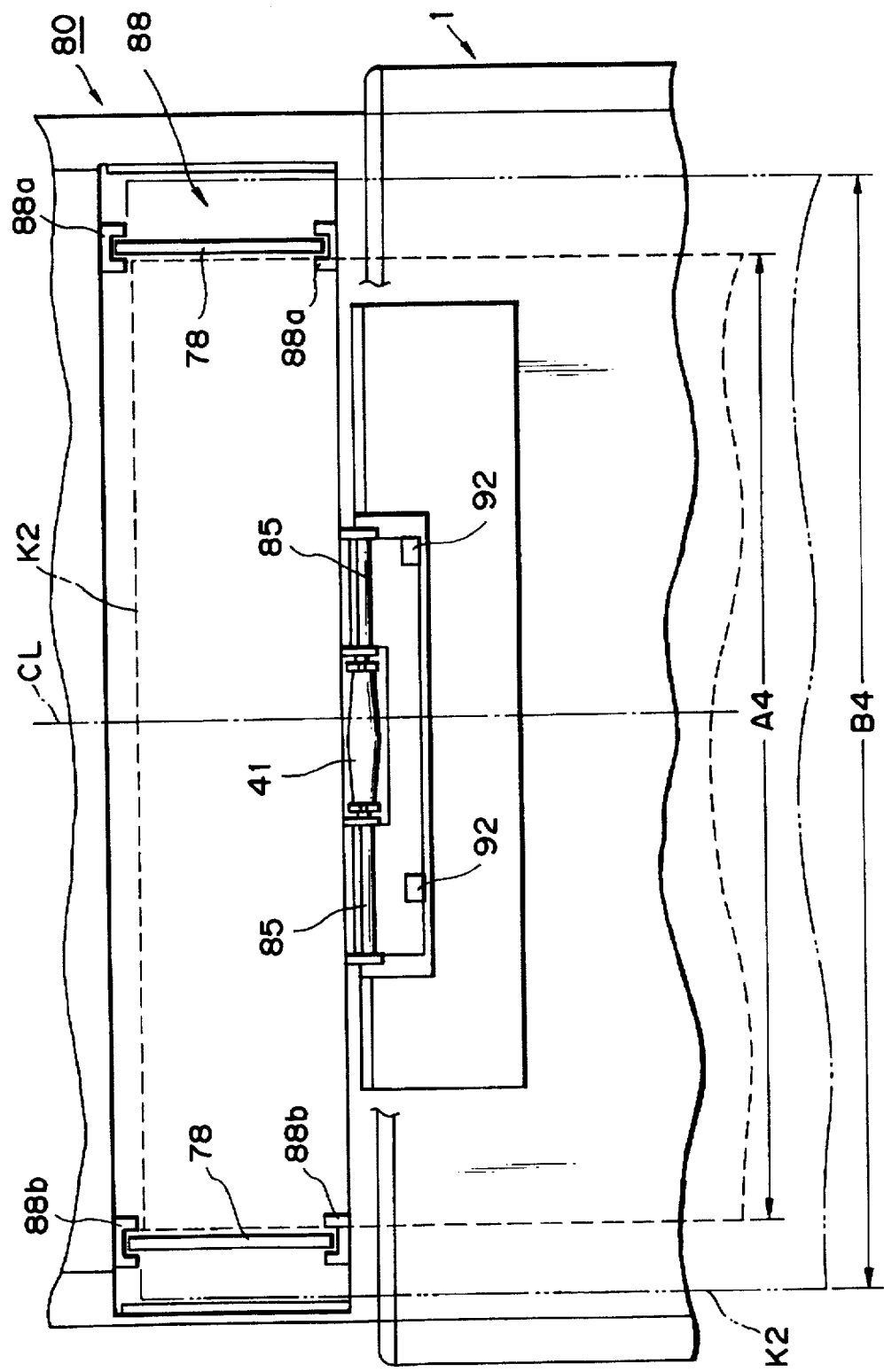
FIG. 13 is a plan view of the compact facsimile apparatus.

FIG. 13 is a plan view of the structure obtained by combining the compact facsimile apparatus 1 and the mounting base 80, showing the positional relationships between rolls of paper K2 having different widths and the storage portion 88 when the rolls of paper are set in the storage portion 88. FIG. 13 also shows a cutaway view of part of the cover battery storage portion 10d of the compact facsimile apparatus 1.

Referring to FIG. 13, the alignment roller 41 is arranged at a center line CL of the mounting base 80 to be located between the levers 85. In addition, each lock member 92 is arranged such that only its distal end portion protrudes at the position shown in FIG. 13. Although the storage portion 88 is designed to store roll paper K2 of a B4 size (width), indicated by the alternate long and two short dashed lines, as the maximum width, it can also store roll paper K2 having an A4 size (width), indicated by the broken lines, or roll paper having a smaller width. In addition, the storage portion 88 is designed to store rolls of paper having different sized such that their center lines coincide with each other. In order to cause the center lines of the respective rolls of paper to coincide with each other, groove portions 88a and 88b are formed in the inner surface of the storage portion 88 at positions symmetrical about the center line CL, and spacer plates 78 can be inserted in these groove portion 88a and 88b, respectively.

In the above-described manner, each roll paper can be set in the storage portion 88, and the alignment roller 41 causes tension to act at a position near the center line of the roll paper while it is conveyed, thereby preventing its meandering movement. As is apparent, roll paper having a size smaller than the A4 size can be stored.

Figure 14:
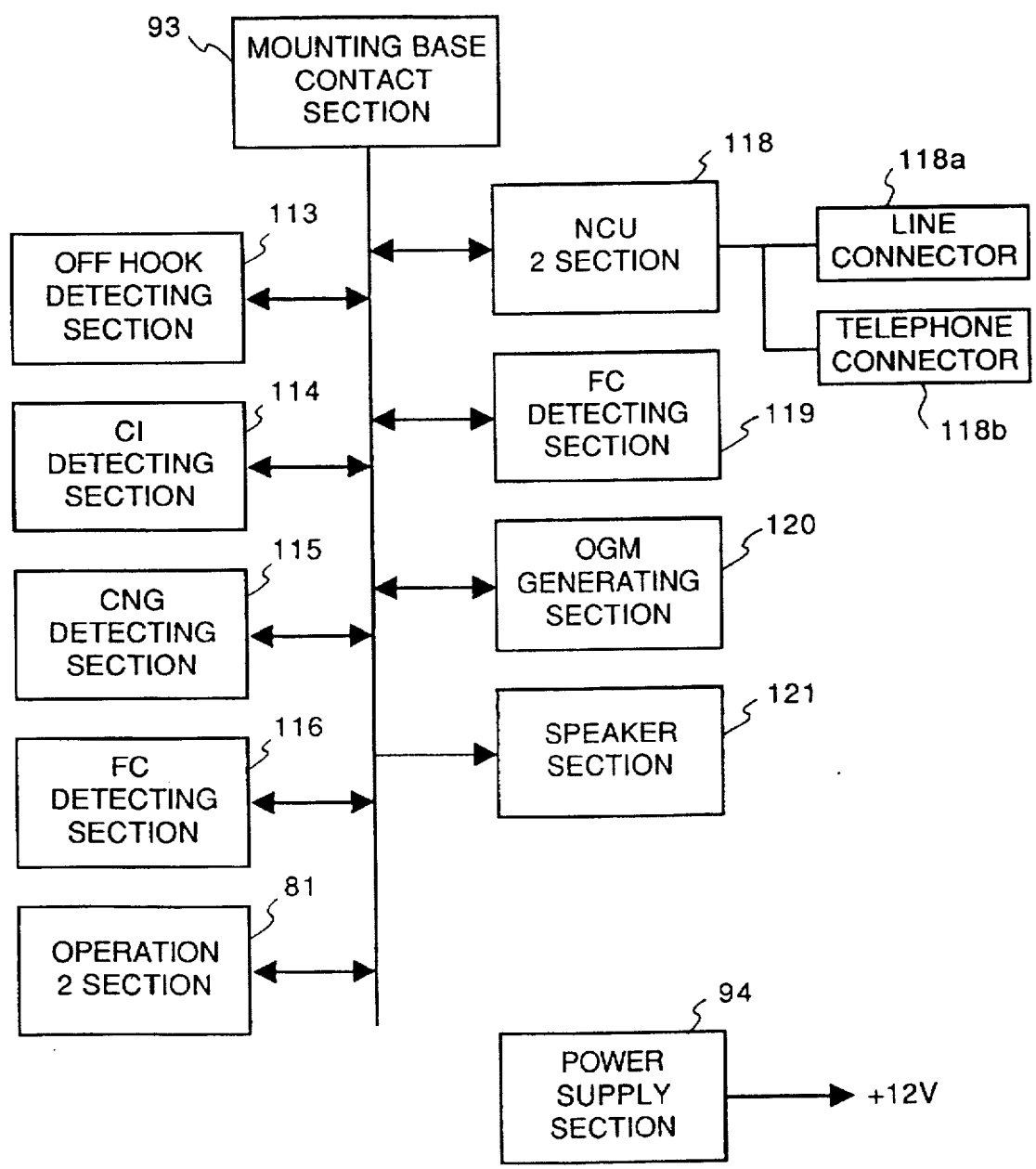
FIG. 14 is a block diagram of the mounting base 80.

The expansion board 79 described with reference to FIG. 10 is connected to the compact facsimile apparatus 1 to realize an automatic answering telephone function as an expanded function. The arrangement of the expansion board 79 will be described below with reference to the block diagram of FIG. 14. Referring to FIG. 14, the following components are connected to the connector 93 as a mounting base contact portion: an OFF HOOK detecting section 113, a CI detecting section 114, a CNG detecting section 115, an FC detecting section 116, an operation 2 section serving both as an operating section 81 formed on the above-mentioned cover portion and a display, a line connector 118a (6a) serving as an NCU 2 section 118 and arranged on the compact facsimile apparatus 1 side, an NCU 2 section 118 connected to a telephone connector 118b (6b), an OMG generating section 119, a sensor 2 section 120, and a speaker section 121. The switching power supply 94 can generate only the same single power of 12 V as that generated by the rechargeable battery 11.

Positive/negative 5-V power and the like for driving the respective ICs and other components are generated by a portion mounted on the discrete board 26 of the compact facsimile apparatus 1.

Figure 15:
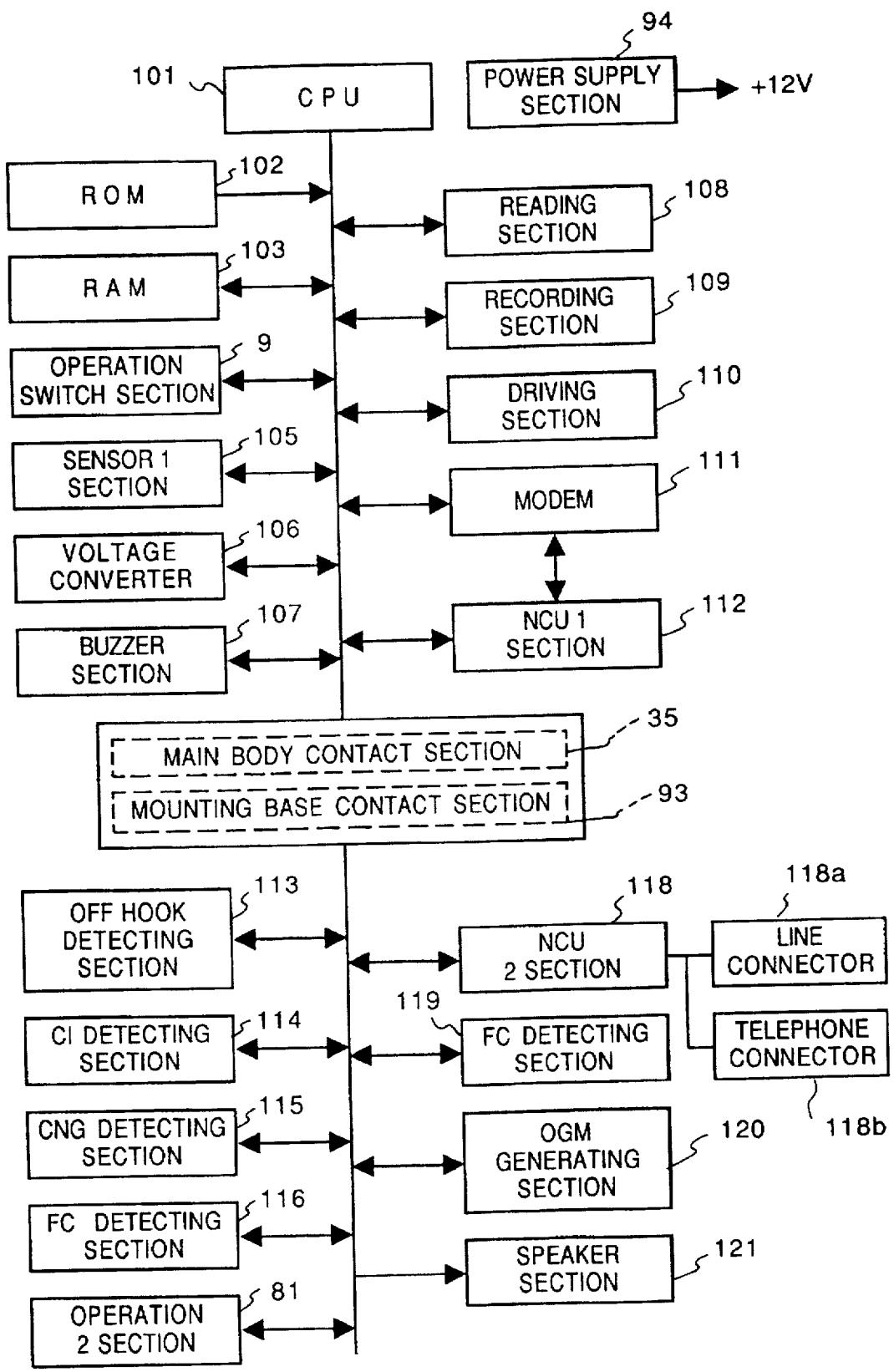
FIG. 15 is a block diagram showing the arrangement of the structure obtained by connecting the compact facsimile apparatus 1 and the mounting base 80 to each other.
Figure 16:
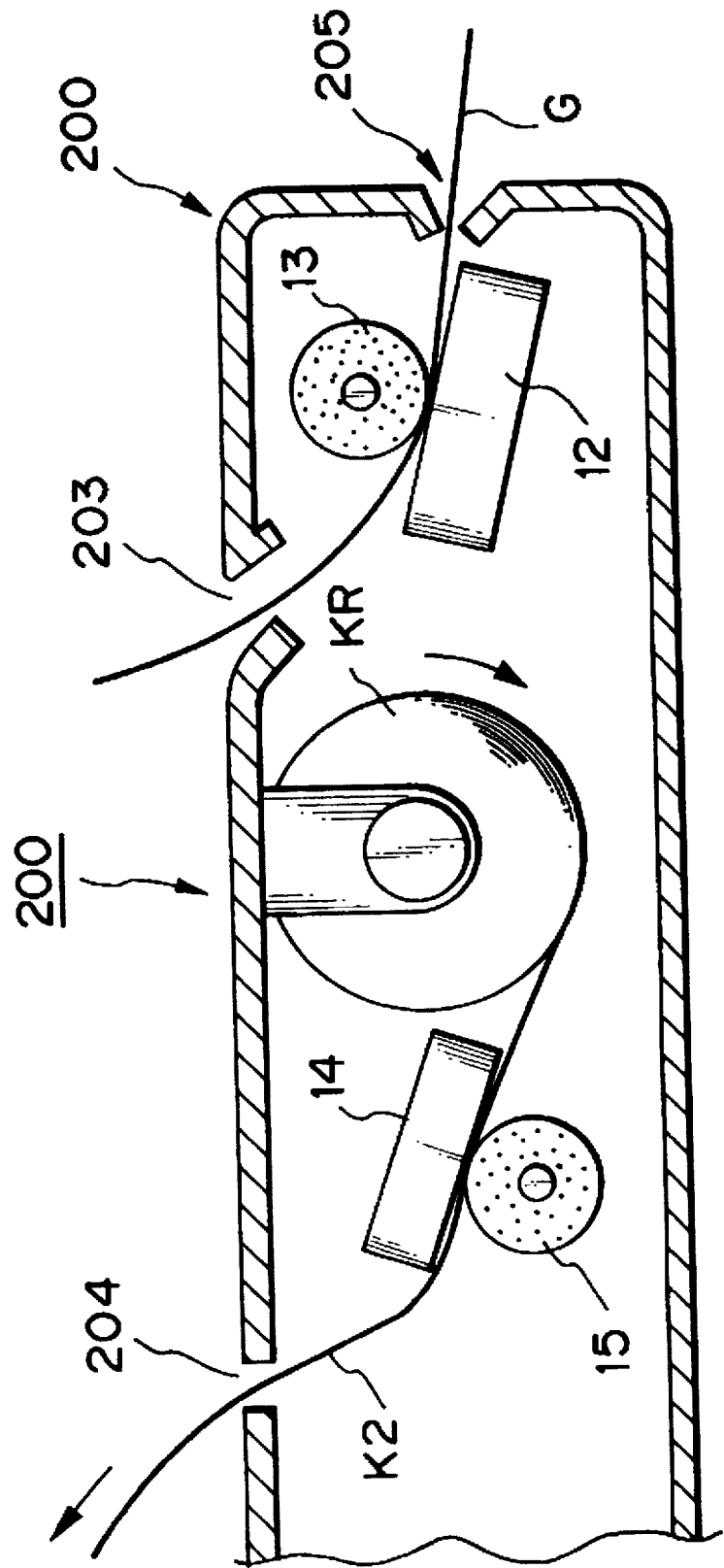
FIG. 16 is a cross-sectional view of a conventional facsimile apparatus.

When the above-described expansion board 79 is connected to the contact portion 35 of the compact facsimile apparatus 1 through the connector (mounting base contact portion) 93 on the mounting base 80 side, various expanded functions required for a known facsimile apparatus can be realized in the state shown in the block diagram of FIG. 15.

As has been described above, according to the present invention, a portable compact facsimile apparatus having at least minimum functions required for a facsimile apparatus can be provided. In addition, the functional expansion section for the facsimile apparatus is designed to be connected to the power supply section, thereby realizing expansion of the function.

As is apparent, various arrangements other than those described above can be employed.

The present invention is not limited to the above embodiments and various changes and modifications can be made within the spirit and scope of the present invention. Therefore, to apprise the public of the scope of the present invention the following claims are made.

What is claimed is:

1. A compact facsimile apparatus having at least a minimum function required for a facsimile apparatus, wherein said apparatus is used in either a connected state or a non-connected state with respect to a functional expansion unit, comprising:

an original reading section for reading an original while conveying said original between an original insert port and original discharge port being provided on a housing of said compact facsimile apparatus;

a recording section for recording onto a recording sheet while conveying said recording sheet between a recording sheet insert port and a recording sheet discharge port being provided on said housing;

a battery storage portion for a battery that drives said original reading section and said recording section, said battery storage portion having a first connector means;

a power supply section for supplying power to said compact facsimile apparatus; and a second connector means, to be connected to said first connector means, for supplying electricity and signals from said functional expansion section to said compact facsimile apparatus, wherein said functional expansion unit has a functional expansion section for expanding the function or adding another function to said compact facsimile apparatus.

2. An apparatus according to claim 1, wherein said first connector means comprises a female connector portion which is connected to said second connector which comprises a male connector arranged in said functional expansion unit and is arranged on a side portion of said battery storage portion.

3. An apparatus according to claim 1, wherein a flat, elongated rechargeable secondary battery is used as said battery.

4. An apparatus according to claim 3, wherein said secondary battery is a nickel-cadmium battery, which can be repeatedly charged by a charger arranged independently of said functional expansion unit.

5. An apparatus according to claim 1, wherein said functional expansion unit comprises a roll-like sheet holder section for continuously supplying a roll-like recording sheet to said recording section, the recording sheet being inserted through said recording sheet insert port and being discharged from said recording sheet discharge port.

6. A compact facsimile apparatus having at least a minimum function required for a facsimile apparatus, wherein said apparatus is used in either a connected state or a non-connected state with respect to a functional expansion unit including a functional expansion section for expanding the function or adding another function, a power supply section for supplying power to said compact facsimile apparatus, and a set portion serving as a mounting base for said compact facsimile apparatus, wherein said compact facsimile apparatus comprises:

an original reading section in which an original to be read is inserted through a first opening portion formed in an upper surface of a housing of said compact facsimile apparatus and is discharged from a discharge port formed in a front surface of said housing;

a recording section in which a recording sheet is inserted through a second opening portion formed in the upper surface of said housing at a position closer to a rear side of the upper surface of the housing than the first opening portion and is discharged from the first opening portion;

a control section arranged on a rear side of said recording section;

a battery storage portion, including the power supply section, for a battery detachably set through a side surface on a rear side of said housing;

a lock portion which is formed on said housing and is locked into a lock member of said functional expansion unit; and connector means which is connected to said functional expansion section and also to said power supply section in said battery storage portion, wherein after the battery is removed, a locked state with respect to the functional expansion unit is set, and the connected state between the functional expansion unit and the facsimile apparatus is also set, thereby allowing a reduction in size and height of said housing.

7. A compact facsimile apparatus having at least a minimum function required for a facsimile apparatus, wherein said apparatus is used in either a connected state or a non-connected state with respect to a functional expansion unit including a functional expansion section for expanding the function or adding another function, a power supply section for supplying power to said compact facsimile apparatus, and a set portion serving as a mounting base for said compact facsimile apparatus, and further comprising a first lock portion, formed on a bottom portion in a battery storage portion, for combining/connecting said compact facsimile apparatus and said functional expansion unit with each other, and a second lock portion formed on a front portion of a bottom surface of said housing, and wherein the connected state is set while a lock member formed on said functional expansion unit is locked in the first and second lock portions.

8. A functional expansion unit which is used to be connected to a facsimile apparatus having an original reading section for reading an original while conveying said original between an original insert port and original discharge port and a recording section for recording onto a recording sheet while conveying said recording sheet between a recording sheet insert port and a recording sheet discharge port, wherein, said functional expansion unit comprises:

a functional expansion section for expanding the function or adding another function;

a roll-like sheet holder for continuously supplying a roll-like recording sheet to said recording section of said facsimile apparatus via said recording sheet insert port;

a power supply section for supplying power to said compact facsimile apparatus;

a set portion serving as a mounting base on which said compact facsimile apparatus is mounted; and connector means for connection with said compact facsimile apparatus, wherein said connector means supply electricity and signals to said compact facsimile apparatus.

9. A unit according to claim 8, wherein said roll-like sheet holder comprises a storage portion for continuously supplying the roll-like recording sheet to said recording section through a second opening portion, and supporting the recording sheet to be rotatable with a recording surface thereof facing outside and allow the continuous supply of the recording sheet, a cover member having one end supported on said storage portion such that said cover member can be freely opened/closed, and the other end covering the second opening portion in a separated state therefrom, and a slanting movement preventing member, arranged near a downstream portion of said storage portion, for preventing meandering/slanting movement of the recording sheet, and guiding the recording sheet between the second opening portion and the slanting movement preventing means with the recording sheet being kept separated form an upper surface of said compact facsimile apparatus.

10. A unit according to claim 9, wherein said cover member comprises a lock member which is locked in the second opening portion.

11. A unit according to claim 9, wherein said slanting movement preventing member is arranged at almost a central portion along a longitudinal direction of said storage portion, and said unit further comprises a support member for supporting recording sheets having different widths such that centers of the recording sheets in a direction of width thereof almost coincide with a center of said storage portion along the longitudinal direction thereof.

12. A portable facsimile apparatus which is used in either a connected state or a non-connected state with respect to a functional expansion unit comprising:

a housing constituting an outer surface of said portable facsimile apparatus;

an original insert port formed at the upper surface of said housing;

an original discharge port formed at the front surface of said housing;

an original reading section for reading an original while conveying said original between said original insert port and said original discharge port being provided on said housing;

a recording sheet insert port formed in the upper surface of said housing at a position closer to a rear side than said original insert port;

a recording sheet discharge port formed in the upper surface of said housing at a position close to said original insert port;

a recording section for recording onto a recording sheet while conveying said recording sheet between said recording sheet insert port and said recording sheet discharge port;

a battery storage portion for battery that drives said original reading section and said recording section, and said battery storage portion having connector means for electrically connecting against said functional expansion unit; and a mounting means being provided on said housing for detachably mounting said functional expansion unit, wherein said mounting means expands and/or add another function to said facsimile apparatus after connected.

* * * * *

UNITED STATES PATENT AND TRADEMARK OFFICE
CERTIFICATE OF CORRECTION

PATENT NO. : 5,706,101

DATED : January 6, 1998

INVENTOR(S) : MINORU YOKOYAMA, ET AL.

It is certified that error appears in the above-identified patent and that said Letters Patent is hereby corrected as shown below:

ON THE TITLE PAGE AT [30]
  Foreign Application Priority Data, "4-004574" should read --4-004572--.

COLUMN 6
  Line 58, "chip board 28" (first occurrence) should read --discrete board 26--.

COLUMN 7
  Line 60, "folw" should read --flow--.

COLUMN 10
  Line 44, "25" should be deleted.

COLUMN 11
  Line 22, "sized" should read --sizes--;
  Line 27, "portion" should read --portions--.

UNITED STATES PATENT AND TRADEMARK OFFICE
CERTIFICATE OF CORRECTION

PATENT NO. : 5,706,101

DATED : January 6, 1998

INVENTOR(S) : MINORU YOKOYAMA, ET AL.

It is certified that error appears in the above-identified patent and that said Letters Patent is hereby corrected as shown below:

COLUMN 14
  Line 18, "form" should read --from--;
  Line 63, "add" should read --adds--.

Signed and Sealed this

Seventh Day of July, 1998

Attest:

BRUCE LEHMAN

*Attesting Officer*   Commissioner of Patents and Trademarks